(12) United States Patent
Li et al.

(10) Patent No.: US 8,665,888 B2
(45) Date of Patent: Mar. 4, 2014

(54) OPTICAL LINE TERMINAL, METHOD AND SYSTEM FOR PACKET TRANSMISSION IN OPTICAL COMMUNICATION SYSTEM

(75) Inventors: Hongyu Li, Shenzhen (CN); Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 13/096,800

(22) Filed: Apr. 28, 2011

(65) Prior Publication Data

US 2011/0200331 A1    Aug. 18, 2011

Related U.S. Application Data

(63) Continuation of application No. PCT/CN2009/074464, filed on Oct. 15, 2009.

(30) Foreign Application Priority Data

Oct. 29, 2008    (CN) .......................... 2008 1 0174309

(51) Int. Cl.
*H04L 12/28*    (2006.01)

(52) U.S. Cl.
USPC ............ 370/401; 370/395.5; 398/51; 398/54; 398/71

(58) Field of Classification Search
USPC ................. 370/389, 401–404, 399, 409, 392, 370/395.5; 398/51, 54, 71
See application file for complete search history.

(56) References Cited

U.S. PATENT DOCUMENTS

| 7,054,557 B1 | 5/2006 | Dasylva et al. |
| 2005/0013611 A1 | 1/2005 | Lee |
| 2007/0211763 A1 | 9/2007 | Solomon et al. |

(Continued)

FOREIGN PATENT DOCUMENTS

| CN | 1592302 A | 3/2005 |
| CN | 1725756 A | 1/2006 |
| CN | 101039159 A | 9/2007 |

OTHER PUBLICATIONS

Written Opinion of the International Searching Authority dated Jan. 28, 2010 in connection with International Patent Application No. PCT/CN2009/074464.

(Continued)

*Primary Examiner* — Dang Ton
*Assistant Examiner* — Mandish Randhawa

(57) ABSTRACT

In the field of communications, a method and a system for packet transmission in an optical communication system, and an Optical Line Terminal (OLT) are provided. The method includes: receiving, from a port, a first uplink packet from an Optical Network Unit (ONU), where the first uplink packet includes a Logical Link Identifier (ID); determining a first ID corresponding to the first uplink packet, where the first ID includes an ONU ID or a Port ID; acquiring a Multiprotocol Label Switching (MPLS) tunnel label according to the Logical Link ID and the first ID; and transmitting a second uplink packet on an MPLS tunnel corresponding to the MPLS tunnel label, where the second uplink packet includes data in the first uplink packet and the MPLS tunnel label. The system includes an ONU and an OLT. By establishing a corresponding relation of a logical link, created between the OLT and the ONU, and the MPLS tunnel, mapping between the logical link and the MPLS tunnel is realized, so that the service configuration has an unlimited capacity and becomes more flexible.

6 Claims, 5 Drawing Sheets

(56) References Cited

U.S. PATENT DOCUMENTS

2008/0198857 A1    8/2008  Kim et al.
2008/0279110 A1*  11/2008  Hart et al. .................... 370/248
2010/0158527 A1*   6/2010  Mizutani et al. ............... 398/78

OTHER PUBLICATIONS

German Santos-Boada, et al., "Quality of Service in Multioperator GPON Access Networks with Triple-Play Services", Proceedings of World Academy of Science, Engineering and Technology, vol. 18, Dec. 2006, p. 69-73.

Partial Translation of Chinese Office Action dated Oct. 9, 2011 in connection with Chinese Application No. 2008101743097.
"Series G: Transmission Systems and Media, Digital Systems and Networks, Digital sections and digital line system—Optical line systems for local and access networks, Gigabit-capable Passive Optical Networks (G-PON): Transmission convergence layer specification"ITU-T G.984.3, Mar. 2008, 148 pages.
Extended European Search Report of the European Searching Authority dated Sep. 11, 2012 in connection with European Patent Application No. 09823050.1, 6 pages.
International Seach Report dated Jan. 28, 2010 in connection with International Patent Application No. PCT/CN2009/074464.

* cited by examiner

OPTICAL LINE TERMINAL, METHOD AND SYSTEM FOR PACKET TRANSMISSION IN OPTICAL COMMUNICATION SYSTEM

CROSS-REFERENCE TO RELATED APPLICATIONS

This application is a continuation of International Application No. PCT/CN2009/074464, filed on Oct. 15, 2009, which claims priority to Chinese Patent Application No. 200810174309.7, filed on Oct. 29, 2008, both of which are hereby incorporated by reference in their entireties.

TECHNICAL FIELD

The present invention relates to the field of communications, and in particular, to a method and a system for packet transmission in an optical communication system, and an Optical Line Terminal (OLT).

BACKGROUND

As a broadband optical access technology, a Passive Optical Network (PON) adopts a point-to-multipoint topology structure. The PON is formed by an Optical Line Terminal (OLT), an Optical Distribution Network (ODN), and one or more Optical Network Units (ONUs) or Optical Network Terminals (ONTs). The OLT is located at a central office, and is not only a switch or router, but also a multi-service providing platform; the OLT can provide various wide area network interfaces, can further provide a plurality of Gigabit Ethernet interfaces and 10-Gigabit Ethernet interfaces, and can also provide switching and routing functions of Layer 2 and Layer 3. The ONU or ONT is located at a user side, and the difference between the ONU and the ONT lies in that the ONT is directly located at a user end, while other networks such as the Ethernet are further located between the ONU and a user; the ONU or ONT can provide various service interfaces, so as to realize user integrated access; and the main function of the ONU or ONT is to receive an optical signal and convert the signal into a form required by a client, such as Ethernet, Internet Protocol (IP) multicast, and T1 (a communication line with a transmission rate up to 1.544 Mb/s). The ODN is formed by passive apparatuses such as a splitter or coupler, and is connected to one OLT and one or more ONUs or ONTs in a passive manner. A PON protocol at least includes a PON data link layer and a PON physical layer, and a Protocol Data Unit (PDU) of the PON data link layer is referred to as a data link layer frame of the PON.

With the increase of broadband services, PON technologies are also evolving continuously, from an Asynchronous Transfer Mode (ATM) PON and a Broadband PON (BPON) to an Ethernet PON (EPON) and a Gigabit PON (GPON). In the GPON which generally bears Ethernet data only, after the PON is terminated on the OLT, the OLT extracts the Ethernet data, and maps user side data into a Multiprotocol Label Switching (MPLS) tunnel according to Ethernet characteristics in the extracted data, for example, maps the user side data into a corresponding MPLS tunnel according to information such as Virtual Local Area Network (VLAN) and 802.1p priority level in the extracted data.

In the implementation of the present invention, the inventors find at least the following problems in the prior art.

1) GPON technologies are not associated with MPLS technologies, and although accessing a network through the GPON, the OLT is further required to map the user side data into the MPLS tunnel through Ethernet after terminating the GPON.

2) Since the mapping between the user side data and the MPLS tunnel can only be performed through the Ethernet, the mapping is somewhat limited by the Ethernet itself, for example, when a plurality of operators shares the same OLT, VLANs of different operators are required to be uniformly planned; otherwise, the OLT cannot map the user side data into the MPLS tunnel according to the VLAN. However, the uniform planning of VLANs of different operators causes a limited capacity and poor flexibility of the service configuration.

SUMMARY

In order to realize mapping between user side data and an MPLS tunnel, embodiments of the present invention provide an OLT, a method and a system for packet transmission in an optical communication system. The technical solutions are as follows.

In one aspect, the present invention provides a method for packet transmission in an optical communication system, where the method includes:

receiving, from a port, a first uplink packet from an ONU, where the first uplink packet includes a Logical Link Identifier (ID) for identifying a logical link between an OLT and the ONU;

determining, according to the first uplink packet, a first ID corresponding to the first uplink packet, where the first ID includes an ONU ID for identifying the ONU or a Port ID for identifying the port;

acquiring, according to the Logical Link ID and the first ID, an MPLS tunnel label corresponding to the Logical Link ID and the first ID; and transmitting a second uplink packet on an MPLS tunnel corresponding to the MPLS tunnel label, where the second uplink packet includes data in the first uplink packet and the MPLS tunnel label.

In one aspect, the present invention further provides a method for packet transmission in an optical communication system, where the method includes:

receiving a first downlink packet, where the first downlink packet includes an MPLS tunnel label;

acquiring, according to the MPLS tunnel label, a first ID corresponding to the MPLS tunnel label and the Logical Link ID for identifying the logical link between an OLT and an ONU, where the first ID includes a Port ID for identifying a port or an ONU ID for identifying the ONU; and transmitting a second downlink packet on the logical link corresponding to the Logical Link ID, where the second downlink packet includes data in the first downlink packet and the Logical Link ID.

In one aspect, the present invention further provides a method for packet transmission in an optical communication system, where the method includes:

receiving, from a port, a first uplink packet from an ONU, where the first uplink packet includes a Logical Link ID for identifying a logical link between an OLT and the ONU;

determining a mapping key domain of the Logical Link ID according to the Logical Link ID;

acquiring, according to the mapping key domain of the Logical Link ID, an index ID or a logical partition ID corresponding to the mapping key domain;

acquiring, according to the index ID or the logical partition ID, an MPLS tunnel label corresponding to the index ID or the logical partition ID; and transmitting a second uplink packet on an MPLS tunnel corresponding to the MPLS tunnel label, where the second uplink packet includes data in the first uplink packet and the MPLS tunnel label.

In another aspect, the present invention further provides an OLT, where the OLT includes:

a first receiving module, configured to receive, from a port, a first uplink packet from an ONU, where the first uplink packet includes a Logical Link ID for identifying a logical link between the OLT and the ONU;

a first determination module, configured to determine, according to the first uplink packet, a first ID corresponding to the first uplink packet, where the first ID includes an ONU ID for identifying the ONU or a Port ID for identifying the port;

a first acquiring module, configured to acquire, according to the Logical Link ID and the first ID, an MPLS tunnel label corresponding to the Logical Link ID and the first ID; and a first transmission module, configured to transmit a second uplink packet on an MPLS tunnel corresponding to the MPLS tunnel label, where the second uplink packet includes data in the first uplink packet and the MPLS tunnel label.

In another aspect, the present invention further provides an OLT, where the OLT includes:

a second receiving module, configured to receive a first downlink packet, where the first downlink packet includes an MPLS tunnel label;

a second acquiring module, configured to acquire, according to the MPLS tunnel label, a first ID corresponding to the MPLS tunnel label and a Logical Link ID for identifying a logical link between the OLT and an ONU, where the first ID includes a Port ID for identifying a port or an ONU ID for identifying the ONU; and a second transmission module, configured to transmit a second downlink packet on the logical link corresponding to the Logical Link ID, where the second downlink packet includes data in the first downlink packet and the Logical Link ID.

In another aspect, the present invention further provides an OLT, where the OLT includes:

a third receiving module, configured to receive, from a port, a first uplink packet from an ONU, where the first uplink packet includes a Logical Link ID for identifying a logical link between the OLT and the ONU;

a second determination module, configured to determine a mapping key domain of the Logical Link ID according to the Logical Link ID;

a third acquiring module, configured to acquire, according to the mapping key domain of the Logical Link ID, an index ID or a logical partition ID corresponding to the mapping key domain;

a fourth acquiring module, configured to acquire, according to the index ID or the logical partition ID acquired by the third acquiring module, an MPLS tunnel label corresponding to the index ID or the logical partition ID; and a third transmission module, configured to transmit a second uplink packet on an MPLS tunnel corresponding to the MPLS tunnel label acquired by the fourth acquiring module, where the second uplink packet includes data in the first uplink packet and the MPLS tunnel label.

In another aspect, the present invention further provides a system for packet transmission in an optical communication system, where the system includes:

an ONU, configured to send a first uplink packet, where the first uplink packet includes a Logical Link ID for identifying a logical link between an OLT and the ONU; and the OLT, configured to receive a first uplink packet sent by the ONU, determine, according to the first uplink packet, a first ID corresponding to the first uplink packet, acquire, according to the Logical Link ID and the first ID, an MPLS tunnel label corresponding to the Logical Link ID and the first ID, and transmit a second uplink packet on an MPLS tunnel corresponding to the MPLS tunnel label, where the first ID includes an ONU ID for identifying the ONU or a Port ID for identifying a port, and the second uplink packet includes data in the first uplink packet and the MPLS tunnel label.

The technical solutions of the present invention have the following beneficial effects.

By establishing a corresponding relation of a logical link, created between the OLT and the ONU, and the MPLS tunnel, mapping between the logical link and the MPLS tunnel is realized, so that the service configuration has an unlimited capacity and becomes more flexible.

DETAILED DESCRIPTION

To make the objectives, technical solutions, and advantages of the present invention clearer, the embodiments of the present invention are described in detail below with reference to the accompanying drawings.

First Embodiment

Figure 1:
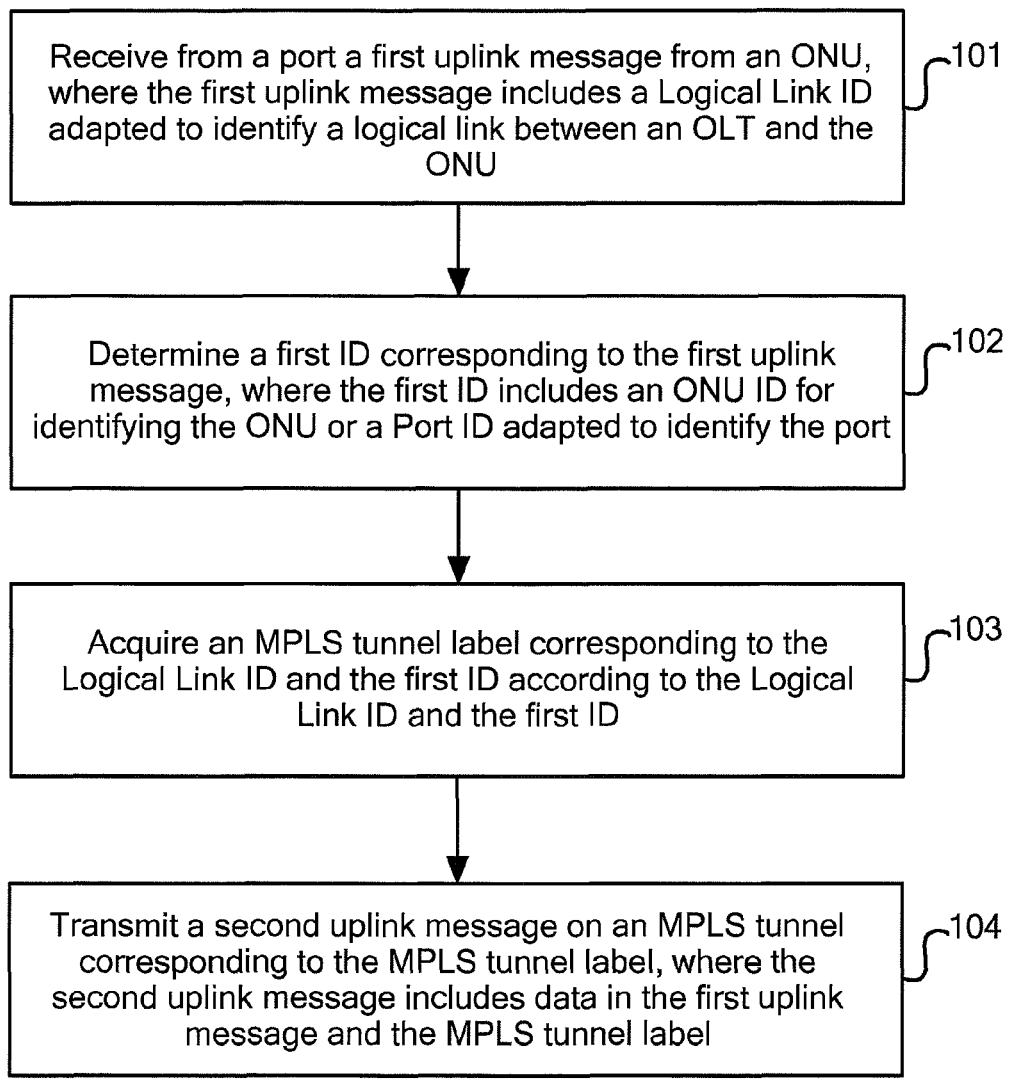
FIG. 1 is a flow chart of a method for packet transmission in an optical communication system according to a first embodiment of the present invention.

FIG. 1 is a flow chart of a method for packet transmission in an optical communication system according to a first embodiment of the present invention. The embodiment of the present invention provides a method for packet transmission in an optical communication system. As shown in FIG. 1, the method includes the following steps.

In step 101, a first uplink packet from an ONU is received from a port, where the first uplink packet includes a Logical Link ID for identifying a logical link between an OLT and the ONU.

In step 102, a first ID corresponding to the first uplink packet is determined according to the first uplink packet, where the first ID includes an ONU ID for identifying the ONU or a Port ID for identifying the port.

In step 103, an MPLS tunnel label corresponding to the Logical Link ID and the first ID is acquired according to the Logical Link ID and the first ID.

In step 104, a second uplink packet is transmitted on an MPLS tunnel corresponding to the MPLS tunnel label, where the second uplink packet includes data in the first uplink packet and the MPLS tunnel label.

The acquiring, according to the Logical Link ID and the first ID, the MPLS tunnel label corresponding to the Logical Link ID and the first ID includes the following steps.

A preset first corresponding relation table is searched according to the Logical Link ID and the first ID, and the MPLS tunnel label is acquired, where the first corresponding relation table includes a corresponding relation of the Logical Link ID, the first ID, and the MPLS tunnel label. The Logical Link ID includes a GEM Port ID or a Logical Link ID (LLID), and the MPLS tunnel label includes an MPLS LSP label.

The acquiring, according to the Logical Link ID and the first ID, the MPLS tunnel label corresponding to the Logical Link ID and the first ID includes the following steps.

A preset second corresponding relation table is searched according to the Logical Link ID and the first ID, and the MPLS tunnel label is acquired, where the second corresponding relation table includes a corresponding relation of the Logical Link ID, the first ID, and a first intermediate ID, and a corresponding relation of a second intermediate ID and the MPLS tunnel label. The Logical Link ID includes the GEM Port ID or the LLID, the first intermediate ID and the second intermediate ID include an index ID or a logical partition ID, and the MPLS tunnel label includes the MPLS LSP label.

Additionally, the MPLS tunnel label further includes a Pseudo Wire (PW) label, and when the MPLS tunnel label further includes a PW label, specifically, the MPLS tunnel label includes an external layer MPLS LSP label and an internal layer PW label; or the MPLS tunnel label includes the external layer MPLS LSP label and an internal layer MPLS LSP label. The second intermediate ID further includes an inlet Port ID.

The acquiring, according to the Logical Link ID and the first ID, the MPLS tunnel label corresponding to the Logical Link ID and the first ID includes the following steps.

A preset third corresponding relation table is searched according to the Logical Link ID and the first ID, and the MPLS tunnel label is acquired, where the third corresponding relation table includes a corresponding relation of the Logical Link ID, the first ID, a primary intermediate ID, and a secondary intermediate ID, a corresponding relation of the primary intermediate ID and an external layer MPLS tunnel label in the MPLS tunnel label, and a corresponding relation of the secondary intermediate ID and an internal layer MPLS tunnel label in the MPLS tunnel label. The Logical Link ID includes the GEM Port ID or the LLID, the MPLS tunnel label includes the external layer MPLS tunnel label and the internal layer MPLS tunnel label, the external layer MPLS tunnel label is an external layer MPLS LSP label, and the internal layer MPLS tunnel label is an internal layer MPLS LSP label or an internal layer PW label.

Figure 2:
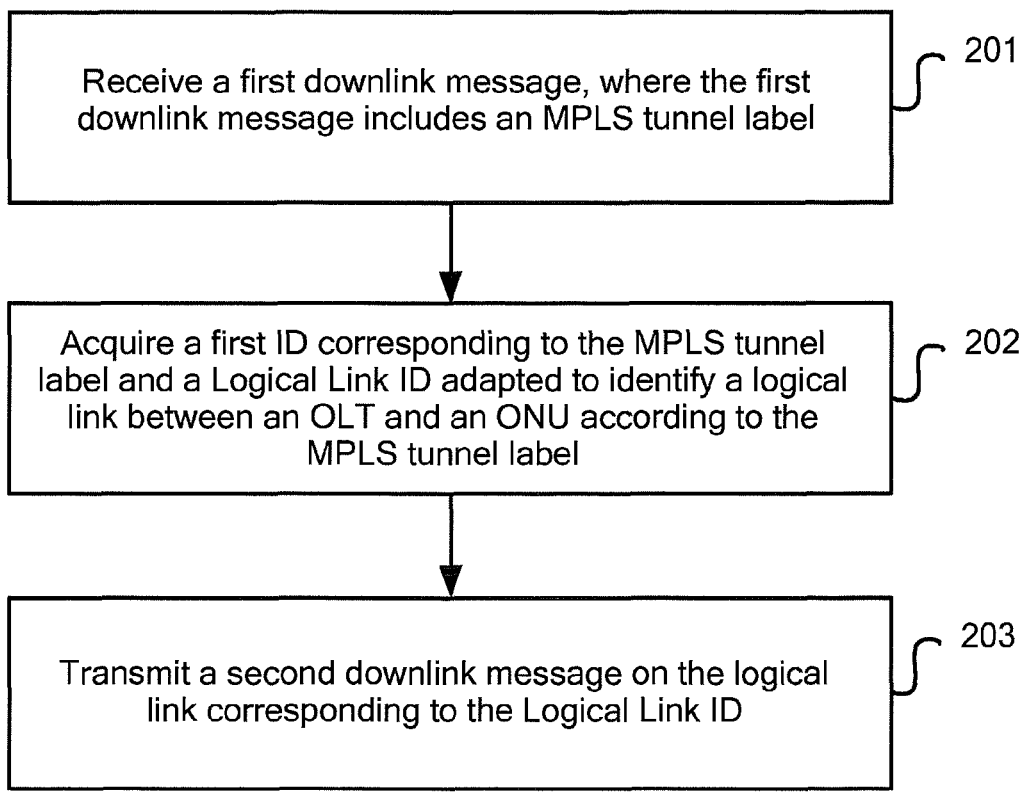
FIG. 2 is a flow chart of another method for packet transmission in an optical communication system according to the first embodiment of the present invention.

FIG. 2 is a flow chart of another method for packet transmission in an optical communication system according to the first embodiment of the present invention. The embodiment of the present invention provides a method for packet transmission in an optical communication system. As shown in FIG. 2, the method includes the following steps.

In step 201, a first downlink packet is received, where the first downlink packet includes an MPLS tunnel label.

In step 202, a first ID corresponding to the MPLS tunnel label and a Logical Link ID for identifying a logical link between an OLT and an ONU are acquired according to the MPLS tunnel label, where the first ID includes a Port ID for identifying a port or an ONU ID for identifying the ONU.

In step 203, a second downlink packet is transmitted on the logical link corresponding to the Logical Link ID, where the second downlink packet includes data in the first downlink packet and the Logical Link ID.

The acquiring, according to the MPLS tunnel label, the first ID corresponding to the MPLS tunnel label and the Logical Link ID for identifying the logical link between the OLT and the ONU includes the following steps.

A preset fourth corresponding relation table is searched according to the MPLS tunnel label, and the first ID and the Logical Link ID are acquired, where the fourth corresponding relation table includes a corresponding relation of: the MPLS tunnel label, the first ID, and the Logical Link ID, the MPLS tunnel label includes the MPLS LSP label, and the Logical Link ID includes the GEM Port ID or the LLID.

Additionally, the MPLS tunnel label further includes data characteristics of the data in the first downlink packet; or the MPLS tunnel label further includes the data characteristics of the data in the first downlink packet and a PW label.

The acquiring, according to the MPLS tunnel label, the first ID corresponding to the MPLS tunnel label and the Logical Link ID for identifying the logical link between the OLT and the ONU includes the following steps.

A preset fifth corresponding relation table is searched according to the MPLS tunnel label, and the first ID and the Logical Link ID are acquired, where the fifth corresponding relation table includes a corresponding relation of an external layer MPLS tunnel label in the MPLS tunnel label and a primary intermediate ID, a corresponding relation of an internal layer MPLS tunnel label in the MPLS tunnel label and a secondary intermediate ID, and a corresponding relation of a primary intermediate ID, a secondary intermediate ID, the first ID, and the Logical Link ID. The MPLS tunnel label includes the external layer MPLS tunnel label and the internal layer MPLS tunnel label, the external layer MPLS tunnel label is an external layer MPLS LSP label, the internal layer MPLS tunnel label is an internal layer MPLS LSP label or an internal layer PW label, the primary intermediate ID includes a primary index ID or a primary logical partition ID, the secondary intermediate ID includes a secondary index ID or a secondary logical partition ID, and the Logical Link ID includes the GEM Port ID or the LLID.

Figure 3:
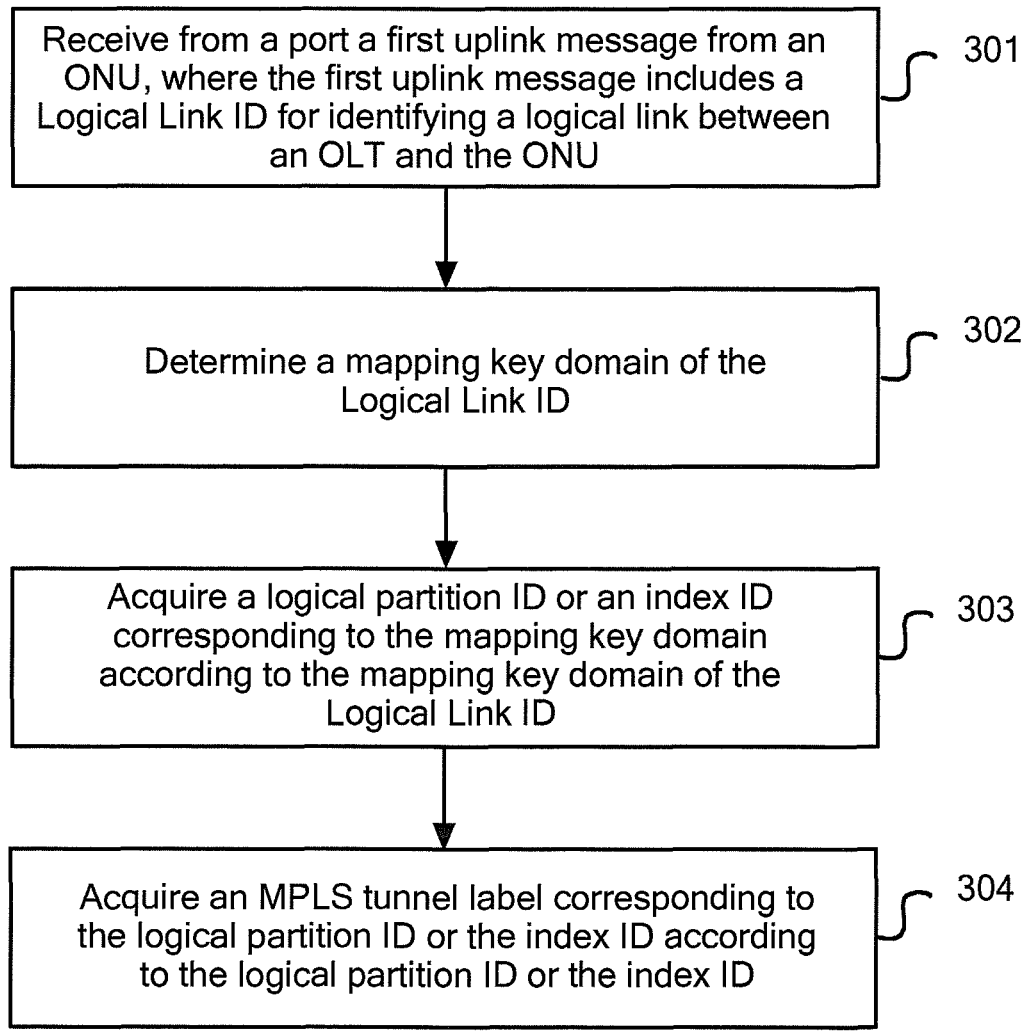
FIG. 3 is a flow chart of still another method for packet transmission in an optical communication system according to the first embodiment of the present invention.

Additionally, FIG. 3 is a flow chart of still another method for packet transmission in an optical communication system according to the first embodiment of the present invention. The embodiment of the present invention further provides a method for packet transmission in an optical communication system. As shown in FIG. 3, the method includes the following steps.

In step 301, a first uplink packet from an ONU is received from a port, where the first uplink packet includes a Logical Link ID for identifying a logical link between an OLT and the ONU.

In step 302, a mapping key domain of the Logical Link ID is determined according to the Logical Link ID.

In step 303, an index ID or a logical partition ID corresponding to the mapping key domain is acquired according to the mapping key domain of the Logical Link ID.

In step 304, an MPLS tunnel label corresponding to the index ID or the logical partition ID is acquired according to the index ID or the logical partition ID.

The mapping key domain of the Logical Link ID is specifically as follows. Preceding n bits of the Logical Link ID (the preceding n bits are referred to as the mapping key domain) represent an index ID or a logical partition ID corresponding to the mapping key domain. The magnitude of n can be specified as required, but is smaller than the maximal length of the adopted Logical Link ID.

In the method according to the embodiment of the present invention, by establishing a corresponding relation of a logical link, created between the OLT and the ONU, and the MPLS tunnel, mapping between the logical link and the MPLS tunnel is realized, so that the service configuration has an unlimited capacity and becomes more flexible.

The embodiment of the present invention is described in detail hereinafter with reference to different scenarios. In the embodiment of the present invention, the logical link between the OLT and the ONU is referred to as a PON logical link.

First scenario: When the PON logical link and the MPLS LSP are in a one-to-one relation, the method includes the following steps.

Uplink direction:

In step 401, after processing service data of a user, the ONU encapsulates the service data into a packet in Ethernet, IP, Time Division Multiplex (TDM), MPLS, PW or other forms that the PON can bear, and then forwards the packet to the OLT through the PON logical link.

The packet further includes information such as an ONU ID and a PON Logical Link ID, where the PON Logical Link ID may be a GEM Port ID in a GPON system, an LLID in an EPON system, or a Logical Link ID defined in other PON systems.

It should be noted that, the ONU according to the embodiment of the present invention may specifically be a device equipped with a PON uplink port or back-transmission port, such as an ONT, a Multi-Dwelling Unit (MDU), and a Multi-Tenant Unit (MTU), which is uniformly represented by the ONU in the embodiment of the present invention for ease of illustration, and a packet in the uplink direction may also be referred to as an uplink packet.

In step 402, the OLT receives a packet sent by the ONU, searches a preset corresponding relation table according to the PON Port ID and the PON Logical Link ID, or the ONU ID and the PON Logical Link ID of the packet, acquires an MPLS LSP label corresponding to the PON Port ID and the PON Logical Link ID, or an MPLS LSP label corresponding to the ONU ID and the PON Logical Link ID, extracts the data in the packet borne by the PON logical link, and then encapsulates the data into the MPLS LSP corresponding to the MPLS LSP label.

It should be noted that, after receiving the packet, the OLT acquires PON port information (the PON Port ID) of the packet; additionally, extracts the data in the packet borne by the PON logical link, and then encapsulates the data into the MPLS LSP corresponding to the MPLS LSP label, that is, transmits the packet on the MPLS tunnel corresponding to the MPLS tunnel label.

A format of the preset corresponding relation table is as shown in Table 1.

TABLE 1

| ONU ID or PON Port ID | PON Logical Link ID | MPLS LSP Label |
| --- | --- | --- |

Table 1 includes a corresponding relation of: PON Port ID, PON Logical Link ID, and MPLS LSP label, or a corresponding relation of: ONU ID, PON Logical Link ID, and MPLS LSP Label.

It should be noted that, for the types of data that can be directly borne by the MPLS, for example, data in the Ethernet, IP, MPLS or PW type, the data can be directly encapsulated into the MPLS LSP; while for the types of data that cannot be directly borne by the MPLS, for example, data in the TDM type, PW encapsulation is required to be firstly performed on the data on the OLT, and then the data is encapsulated into the MPLS LSP.

Downlink direction:

The OLT receives a downlink packet (the downlink packet is borne in the MPLS LSP and sent to the OLT), searches a preset corresponding relation table according to an MPLS LSP label of the downlink packet, acquires the PON Port ID and the PON Logical Link ID, or the ONU ID and the PON Logical Link ID corresponding to the MPLS LSP label, extracts data in the packet borne by the MPLS LSP, and then encapsulates the data into the PON logical link corresponding to the PON Logical Link ID.

The preset corresponding relation table is as shown in Table 1.

It should be noted that, if additional PW encapsulation is performed in the uplink direction, PW decapsulation is required to be firstly performed on the received packet in the downlink direction, and then the decapsulated data is encapsulated into the PON logical link corresponding to the PON Logical Link ID.

Second scenario: When the MPLS LSP (referred to as an external layer MPLS LSP) bears a PW (referred to as an internal layer PW), and the PON logical link and the internal layer PW are in a one-to-one relation, the method includes the following steps.

Uplink direction:

In step 501, the implementation is the same as that in step 401, and will not be repeated herein.

In step 502, the OLT receives a packet sent by the ONU, searches a preset corresponding relation table according to a PON Port ID and a PON Logical Link ID, or an ONU ID and the PON Logical Link ID of the packet, acquires the external layer MPLS LSP label and the internal layer PW label corresponding to the PON Port ID and the PON Logical Link ID, or the external layer MPLS LSP label and the internal layer PW label corresponding to the ONU ID and the PON Logical Link ID, extracts the data in the packet borne by the PON logical link, and then encapsulates the data into the internal layer PW corresponding to the internal layer PW label.

A format of the preset corresponding relation table is as shown in Table 2.

TABLE 2

| ONU ID or PON Port ID | PON Logical Link ID | External Layer MPLS LSP Label | Internal Layer PW Label |
| --- | --- | --- | --- |

Table 2 includes a corresponding relation of: PON Port ID, PON Logical Link ID, External Layer MPLS LSP Label, and Internal Layer PW Label, or a corresponding relation of: ONU ID, PON Logical Link ID, External Layer MPLS LSP Label, and Internal Layer PW Label.

Downlink direction:

The OLT receives a downlink packet (the downlink packet is borne in an internal layer PW), searches a preset corresponding relation table according to an external layer MPLS LSP label and an internal layer PW label of the downlink packet, acquires a PON Port ID and a PON Logical Link ID, or an ONU ID and the PON Logical Link ID corresponding to the external layer MPLS LSP label and the internal layer PW label, extracts data in the packet borne by the internal layer PW, and then encapsulates the data into a PON logical link corresponding to the PON Logical Link ID.

A format of the preset corresponding relation table is as shown in Table 2.

Third scenario: When the PON logical link and the MPLS LSP are in a many-to-one relation, the method includes the following steps.

Uplink direction:

A process in the uplink direction is the same as the process in the uplink direction when the PON logical link and the MPLS LSP are in the one-to-one relation, and the details will not be repeated herein.

Downlink direction:

The OLT receives a downlink packet (the downlink packet is borne in an MPLS LSP), searches a corresponding relation table according to the MPLS LSP label of the downlink packet and data characteristics of data in the downlink packet borne by the MPLS LSP, acquires a PON Port ID and a PON Logical Link ID, or an ONU ID and the PON Logical Link ID corresponding to the MPLS LSP label and the data characteristics of the data in the downlink packet borne by the MPLS LSP, extracts data in the downlink packet borne by the MPLS LSP, and then encapsulates the data into a PON logical link corresponding to the PON Logical Link ID.

The data characteristics include, but are not limited to, an MAC address of the data and a PW label, and these characteristics may be acquired and saved by the OLT during the process in the uplink direction, and may also be configured in the OLT in advance.

A format of the preset corresponding relation table is as shown in Table 3.

TABLE 3

| MPLS LSP Label | Data characteristics | ONU ID or PON Port ID | PON Logical Link ID |
| --- | --- | --- | --- |

Table 3 includes a corresponding relation of: MPLS LSP Label, Data Characteristics, PON Port ID, and PON Logical Link ID, or a corresponding relation of: MPLS LSP Label, Data Characteristics, ONU ID, and PON Logical Link ID.

It should be noted that, if additional PW encapsulation is performed in the uplink direction, PW decapsulation is required to be firstly performed on the data, and then the decapsulated data is encapsulated into the PON logical link corresponding to the PON Logical Link ID.

Fourth scenario: When an external layer MPLS LSP bears an internal layer PW, and the PON logical link and the internal layer PW are in a many-to-one relation, the method includes the following steps.

Uplink direction:

A process in the uplink direction is the same as the process in the uplink direction when the PON logical link and the internal layer PW are in the one-to-one relation, and the details will not be repeated herein.

Downlink direction:

The OLT receives a downlink packet (the downlink packet is borne in an internal layer PW), searches a preset corresponding relation table according to the external layer MPLS LSP label and the internal layer PW label of the downlink packet, and data characteristics of data in the downlink packet borne by the internal layer PW, acquires a PON Port ID and a PON Logical Link ID, or an ONU ID and the PON Logical Link ID corresponding to the external layer MPLS LSP label, the internal layer PW label, and the data characteristics of the data in the downlink packet borne by the internal layer PW, extracts data in the downlink packet borne by the internal layer PW, and then encapsulates the data into a PON logical link corresponding to the PON Logical Link ID.

The data characteristics include, but are not limited to, an MAC address of the data and a TDM time sequence number, and these characteristics may be acquired and saved by the OLT during the process in the uplink direction, and may also be configured in the OLT in advance.

A format of the preset corresponding relation table is as shown in Table 4.

TABLE 4

| External Layer MPLS LSP Label | Internal Layer PW Label | Data Characteristics | ONU ID or PON Port ID | PON Logical Link ID |
| --- | --- | --- | --- | --- |

Table 4 includes a corresponding relation of: External layer MPLS LSP Label, Internal Layer PW Label, Data Characteristics, PON Port ID, and PON Logical Link ID, or a corresponding relation of: External Layer MPLS LSP Label, Internal Layer PW Label, Data Characteristics, ONU ID, and PON Logical Link ID.

Additionally, the PON Logical Link ID can be categorized according to the operator, the service type, the service class, the path or other characteristics, and the different categories are respectively represented by different index IDs or logical partition IDs, for example, an operator index ID or an operator logical partition ID is used to represent the operator; and a service type index ID or a service type logical partition ID is used to represent the service type. In this manner, the user only needs to manage the index ID or the logical partition ID, and does not need to manage a specific PON Logical Link ID, thereby simplifying the management and improving the efficiency. How the OLT realizes the mapping between the PON logical link and the MPLS LSP according to the index ID or the logical partition ID is described in detail hereinafter with reference to specific cases.

Fifth scenario: The index ID or the logical partition ID is used to represent the category of the PON Logical Link ID. When the index ID or the logical partition ID and the MPLS LSP are in a one-to-one or many-to-one relation, the following steps are included.

Uplink direction:

In step 601, the implementation is the same as that in step 401, and will not be repeated herein.

In step 602, the OLT receives a packet sent by the ONU, searches a preset corresponding relation table of the index ID or the logical partition ID and the PON Logical Link ID according to a PON Port ID and a PON Logical Link ID, or an ONU ID and the PON Logical Link ID of the packet, and retrieves the index ID or the logical partition ID corresponding to the PON Logical Link ID.

A format of the preset corresponding relation table of the index ID or the logical partition ID and the PON Logical Link ID is as shown in Table 5.

TABLE 5

| Index ID or Logical Partition ID | ONU ID or PON Port ID | PON Logical Link ID |
| --- | --- | --- |

Table 5 includes a corresponding relation of: Logical Partition ID, PON Port ID, and PON Logical Link ID, or a corresponding relation of: Index ID, ONU ID, and PON Logical Link ID, or a corresponding relation of: Logical Partition ID, ONU ID, and PON Logical Link ID, or a corresponding relation of: Index ID, PON Port ID, and PON Logical Link ID.

The specific process of setting the preset corresponding relation table of the index ID or the logical partition ID and the PON Logical Link ID is as follows.

The index ID or the logical partition ID is set, and each index ID or logical partition ID can be used to represent the operator, the service type, the service class, the path or other characteristics as required. After the index ID or the logical partition ID is set, an ONU corresponding to the index ID or the logical partition ID is set, and then the OLT automatically specifies the PON Logical Link ID used by the ONU for the ONU or negotiates with the ONU to determine the PON Logical Link ID used by the ONU.

In step 603, after the index ID or the logical partition ID corresponding to the PON Logical Link ID is retrieved, a preset corresponding relation table of the index ID or the logical partition ID and the MPLS LSP label is searched according to the index ID or the logical partition ID, the MPLS LSP label corresponding to the index ID or the logical partition ID is acquired, the data in the packet borne by the PON logical link is extracted, and then the extracted data is encapsulated into the MPLS LSP corresponding to the MPLS LSP label.

A format of the preset corresponding relation table of the index ID or the logical partition ID and the MPLS LSP label is as shown in Table 6.

TABLE 6

| Index ID or Logical Partition ID | MPLS LSP Label |
| --- | --- |

Table 6 includes a corresponding relation of: Logical Partition ID and MPLS LSP Label, or corresponding relation of: Index ID and MPLS LSP Label.

It should be noted that, for the types of data that can be directly borne by the MPLS, for example, data in the Ethernet, IP, MPLS or PW type, the data can be directly encapsulated into the MPLS LSP; while for the types of data that cannot be directly borne by the MPLS, for example, data in the TDM type, PW encapsulation is required to be firstly performed on the data on the OLT, and then the data is encapsulated into the MPLS LSP.

Further, for the preset corresponding relation table of the index ID or the logical partition ID and the PON Logical Link ID as shown in Table 5, preceding n bits of the PON Logical Link ID (the preceding n bits are referred to as the mapping key domain) may also be adopted to represent the index ID or the logical partition ID corresponding to the PON Logical Link ID. The magnitude of n can be specified as required, but is smaller than the maximal length of the adopted PON Logical Link ID. Furthermore, for the adopting the mapping key domain of the PON Logical Link ID to represent the index ID or the logical partition ID corresponding to the PON Logical Link ID, specifically, a representation manner that the index ID or the logical partition ID is consistent with the mapping key domain of the PON Logical Link ID can be adopted. For example, if the index ID or the logical partition ID set on the OLT is 101, when the OLT assigns the PON Logical Link ID to the ONU or negotiates with the ONU about the PON Logical Link ID, preceding three bits of the PON Logical Link ID should be 101, that is, the PON Logical Link ID is required to be in a 101xxxx format. Specifically, a representation manner that the index ID or the logical partition ID is inconsistent with the mapping key domain of the PON Logical Link ID can be further adopted. When a representation manner that the index ID or the logical partition ID is inconsistent with the mapping key domain in the PON Logical Link ID is adopted, a corresponding relation table of the index ID or the logical partition ID and the mapping key domain as shown in Table 7 is required to be established.

TABLE 7

| Index ID or Logical Partition ID | Mapping Key Domain |
| --- | --- |

Table 7 includes a corresponding relation of: Logical Partition ID and Mapping Key Domain, or a corresponding relation of: Index ID and Mapping Key Domain.

It should be noted that, if the representation manner that the index ID or the logical partition ID is inconsistent with the mapping key domain of the PON Logical Link ID is adopted, step 602 includes the following steps. The OLT receives the packet sent by the ONU, searches the preset corresponding relation table of the index ID or the logical partition ID and the mapping key domain as shown in Table 7 according to the mapping key domain of the PON Logical Link ID in the packet, and retrieves the index ID or the logical partition ID corresponding to the PON Logical Link ID. If the representation manner that the index ID or the logical partition ID is consistent with the mapping key domain of the PON Logical Link ID is adopted, since the mapping key domain of the PON Logical Link ID is just the index ID or the logical partition ID, step 602 can be omitted.

Additionally, it should be noted that, when the corresponding relation table of the index ID or the logical partition ID and the MPLS LSP label is established, the ONU ID or PON Port ID may also be used as parameters, and in this manner, a more subtle mapping between the PON Logical Link ID and the MPLS LSP label can be acquired. Accordingly, when the corresponding relation table of the index ID or the logical partition ID and the MPLS LSP label is searched, the corresponding relation table is required to be searched according to both the index ID or the logical partition ID and the ONU ID or PON Port ID. Table 8 shows a format of the corresponding relation table of the index ID or the logical partition ID and the MPLS LSP label when ONU ID or PON Port ID is also used as a parameter.

TABLE 8

| Index ID or Logical Partition ID | ONU ID or PON Port ID | MPLS LSP Label |
| --- | --- | --- |

Downlink direction:

A process in the downlink direction is the same as the process in the downlink direction when the PON logical link and the MPLS LSP are in the many-to-one relation, and the details will not be repeated herein.

Sixth scenario: The index ID or the logical partition ID is used to represent the category of the PON Logical Link ID. When the external layer MPLS LSP bears the internal layer PW, and the index ID or the logical partition ID and the PW are in a one-to-one or many-to-one relation, the following steps are included.

Uplink direction:

In step 701, the implementation is the same as that in step 401, and will not be repeated herein.

In step 702, the implementation is the same as that in step 602, and will not be repeated herein.

In step 703, after the index ID or the logical partition ID corresponding to the PON Logical Link ID is retrieved, a preset corresponding relation table of the index ID or the logical partition ID and the internal layer PW label is searched according to the index ID or the logical partition ID, the internal layer PW label corresponding to the index ID or the logical partition ID is acquired, the data in the packet borne by the PON logical link is extracted, and then the extracted data is encapsulated into the internal layer PW corresponding to the internal layer PW label.

A format of the preset corresponding relation table of the index ID or the logical partition ID and the internal layer PW label is as shown in Table 9.

TABLE 9

| Index ID or Logical Partition ID | External Layer MPLS LSP Label | Internal Layer PW Label |
| --- | --- | --- |

Table 9 includes a corresponding relation of: Logical Partition ID, External Layer MPLS LSP Label, and Internal Layer PW Label, or a corresponding relation of: Index ID, External Layer MPLS LSP Label, and Internal Layer PW Label.

Additionally, it should be noted that, when the corresponding relation table of the index ID or the logical partition ID and the internal layer PW label is established, the ONU ID or PON Port ID may also be used as parameters, and in this manner, a more subtle mapping between the PON Logical Link ID and the internal layer PW label can be acquired. Accordingly, when the corresponding relation table of the index ID or the logical partition ID and the internal layer PW label is searched, the corresponding relation table is required to be searched according to both the index ID or the logical partition ID and the ONU ID or PON Port ID. Table 10 shows a format of the corresponding relation table of the index ID or the logical partition ID and the internal layer PW label when the ONU ID or PON Port ID is also used as a parameter.

TABLE 10

| Index ID or Logical Partition ID | ONU ID or PON Port ID | External Layer MPLS LSP Label | Internal Layer PW Label |
| --- | --- | --- | --- |

Downlink direction:

A process in the downlink direction is the same as the process in the downlink direction when the PON logical link and the internal layer PW are in the many-to-one relation, and the details will not be repeated herein.

Seventh scenario: The index ID or the logical partition ID is used to represent the category of the PON Logical Link ID. When the external layer MPLS LSP bears the internal layer MPLS LSP, the following steps are included.

Uplink direction:

In step 801, the implementation is the same as that in step 401, and will not be repeated herein.

In step 802, the OLT receives the packet sent by the ONU, searches a preset corresponding relation table of the PON Logical Link ID included by the index ID or the logical partition ID and the internal layer MPLS LSP label borne by the external layer MPLS LSP label according to a PON Port ID and a PON Logical Link ID, or an ONU ID and the PON Logical Link ID of the packet, acquires the PON Port ID and the PON Logical Link ID, or the external layer MPLS LSP label and the internal layer MPLS LSP label corresponding to the ONU ID and the PON Logical Link ID, extracts the data in the packet borne by the PON logical link, and then encapsulates the data into the internal layer MPLS LSP corresponding to the internal layer MPLS LSP label.

A format of the preset corresponding relation table of the PON Logical Link ID included by the index ID or the logical partition ID and the internal layer MPLS LSP label borne by the external layer MPLS LSP label is as shown in Table 11.

TABLE 11

| ONU ID or PON Port ID | PON Logical Link ID | External Layer MPLS LSP Label | Internal Layer MPLS LSP Label |
| --- | --- | --- | --- |

Table 11 includes a corresponding relation of: PON Port ID, PON Logical Link ID, External Layer MPLS LSP label, and Internal Layer MPLS LSP Label, or a corresponding relation of: ONU ID, PON Logical Link ID, External Layer MPLS LSP Label, and Internal Layer MPLS LSP Label.

The specific process of setting the corresponding relation table of the PON Logical Link ID included by the index ID or the logical partition ID and the internal layer MPLS LSP label borne by the external layer MPLS LSP label is as follows.

The corresponding relation table of the index ID or the logical partition ID and the PON Logical Link ID as shown in Table 5 is set, and the specific setting process is the same as the setting process of Table 5, the details of which will not be repeated herein.

The corresponding relation table of the index ID or the logical partition ID and the external layer MPLS LSP label as shown in Table 12 is set, and a condition that each index ID or logical partition ID corresponds to one external layer MPLS LSP label is required to be satisfied.

TABLE 12

| Index ID or Logical Partition ID | External Layer MPLS LSP Label |
| --- | --- |

Further, the corresponding relation table of the PON Logical Link ID included by the index ID or the logical partition ID and the internal layer MPLS LSP label borne by the external layer MPLS LSP label as shown in Table 13 is set.

TABLE 13

| ONU ID or PON Port ID | PON Logical Link ID | Internal layer MPLS LSP Label |
| --- | --- | --- |

Then, Table 11 can be acquired according to Tables 5, 12, and 13.

It should be noted that, for the types of data that can be directly borne by the MPLS, for example, data in the Ethernet, IP, MPLS or PW type, the data can be directly encapsulated into the MPLS LSP; while for the types of data that cannot be directly borne by the MPLS, for example, data in the TDM type, PW encapsulation is required to be firstly performed on the data on the OLT, and then the data is encapsulated into the MPLS LSP.

Downlink direction:

The OLT receives a downlink packet, searches a preset corresponding relation table of the PON Logical Link ID included by the index ID or the logical partition ID and the internal layer PW label borne by the external layer MPLS LSP label according to the external layer MPLS LSP label and the internal layer MPLS LSP label of the downlink packet, acquires a PON Port ID and a PON Logical Link ID, or an ONU ID and the PON Logical Link ID corresponding to the external layer MPLS LSP label and the internal layer MPLS LSP label, extracts data borne by the internal layer MPLS LSP, and then encapsulates the data into a PON logical link corresponding to the PON Logical Link ID.

A format of the preset corresponding relation table of the PON Logical Link ID included by the index ID or the logical partition ID and the internal layer PW label borne by the external layer MPLS LSP label is as shown in Table 11.

It should be noted that, if additional PW encapsulation is performed in the uplink direction, PW decapsulation is required to be firstly performed on the received packet, and then the decapsulated data is encapsulated into the PON logical link corresponding to the PON Logical Link ID.

Eighth scenario: the index ID or the logical partition ID is used to represent the category of the PON Logical Link ID. When the external layer MPLS LSP bears the internal layer PW, the following steps are included.

Uplink direction:

In step 901, the implementation is the same as that in step 401, and will not be repeated herein.

In step 902, the OLT receives the packet sent by the ONU, searches a preset corresponding relation table of the PON Logical Link ID included by the index ID or the logical partition ID and the internal layer PW label borne by the external layer MPLS LSP label according to a PON Port ID and a PON Logical Link ID, or an ONU ID and the PON Logical Link ID of the packet, acquires the PON Port ID and the PON Logical Link ID, or the external layer MPLS LSP label and the internal layer PW label corresponding to the ONU ID and the PON Logical Link ID, extracts the data in the packet borne by the PON logical link, and then encapsulates the data into the internal layer PW corresponding to the internal layer PW label.

A format of the preset corresponding relation table of the PON Logical Link ID included by the index ID or the logical partition ID and the internal layer PW label borne by the external layer MPLS LSP label is as shown in Table 14, and the specific setting process is the same as the setting process of Table 11, the details of which will not be repeated herein.

TABLE 14

| ONU ID or PON Port ID | PON Logical Link ID | External Layer MPLS LSP Label | Internal Layer PW Label |
| --- | --- | --- | --- |

Table 14 includes a corresponding relation of: PON Port ID, PON Logical Link ID, External Layer MPLS LSP Label, and Internal Layer PW Label, or a corresponding relation of: ONU ID, PON Logical Link ID, External Layer MPLS LSP Label, and Internal Layer PW Label.

Downlink direction:

The OLT receives a downlink packet, searches a preset corresponding relation table of the PON Logical Link ID included by the index ID or the logical partition ID and the internal layer PW label borne by the external layer MPLS LSP label according to the external layer MPLS LSP label and the internal layer PW label of the downlink packet, acquires a PON Port ID and a PON Logical Link ID, or an ONU ID and the PON Logical Link ID corresponding to the external layer MPLS LSP label and the internal layer PW label, extracts data borne by the internal layer PW, and then encapsulates the data into a PON logical link corresponding to the PON Logical Link ID.

A format of the preset corresponding relation table of the PON Logical Link ID included by the index ID or the logical partition ID and the internal layer PW label borne by the external layer MPLS LSP label is as shown in Table 14.

Ninth scenario: the index ID or the logical partition ID is used to represent the category of the PON Logical Link ID, and the index ID or the logical partition ID may be further set as multiple levels (primary, secondary, tertiary, . . . ), so as to realize subtle mapping and management for hierarchy of the PON logical link. An example is given below for illustration by setting the index ID or the logical partition ID as the secondary level.

Uplink direction:

In step 1001, the implementation is the same as that in step 401, and will not be repeated herein.

In step 1002, the OLT receives the packet sent by the ONU, searches a preset corresponding relation table of a primary logical partition ID, a secondary logical partition ID, and the PON Logical Link ID, or a preset corresponding relation table of a primary index ID, a secondary index ID, and the PON Logical Link ID according to a PON Port ID and a PON Logical Link ID, or an ONU ID and the PON Logical Link ID of the packet, and acquires a primary index ID or a primary logical partition ID and a secondary index ID or a secondary logical partition ID corresponding to the PON Port ID and the PON Logical Link ID, or the ONU ID and the PON Logical Link ID.

A format of the preset corresponding relation table of the primary logical partition ID, the secondary logical partition ID, the PON Port ID and the PON Logical Link ID, or the preset corresponding relation table of the primary index ID, the secondary index ID, the PON Port ID and the PON Logical Link ID is as shown in Table 15.

TABLE 15

| Primary Index ID or Primary Logical Partition ID | Secondary Index ID or Secondary Logical Partition ID | ONU ID or PON Port ID | PON Logical Link ID |
| --- | --- | --- | --- |

Table 15 includes a corresponding relation of: Primary Index ID or Primary Logical Partition ID, Secondary Index ID or Secondary Logical Partition ID, ONU ID or PON Port ID, and PON Logical Link ID.

It should be noted that, the primary index ID or primary logical partition ID is generally set globally on the OLT, while the secondary and even multi-level index ID or secondary and even multi-level logical partition ID may be set in each primary index ID or primary logical partition ID as required, and may also be set globally on the OLT. For example, the primary index ID or primary logical partition ID is adopted to identify different operators, while the secondary index ID or secondary logical partition ID is adopted to identify different service types, service classes or paths.

When the primary index ID or primary logical partition ID is set globally on the OLT, while the secondary and even multi-level index ID or secondary and even multi-level logical partition ID is set in each primary index ID or primary logical partition ID, the primary index ID or primary logical partition ID is set to correspond to the external layer MPLS LSP label, and the secondary index ID or secondary logical partition ID is set to correspond to the internal layer MPLS LSP label or PW label.

In step 1003, after the primary index ID or primary logical partition ID and the secondary index ID or secondary logical partition ID corresponding to the PON Port ID and the PON Logical Link ID, or the ONU ID and the PON Logical Link ID are acquired, a preset corresponding relation table of the primary index ID or primary logical partition ID and the external layer MPLS LSP label is searched according to the acquired primary index ID or primary logical partition ID, the external layer MPLS LSP label corresponding to the primary index ID or primary logical partition ID is acquired; a preset corresponding relation table of the secondary index ID or secondary logical partition ID and the internal layer MPLS LSP label or the internal layer PW label is searched according to the acquired secondary index ID or secondary logical partition ID, the internal layer MPLS LSP label or the internal layer PW label corresponding to the secondary index ID or secondary logical partition ID is acquired; the data in the packet borne by the PON logical link is extracted, and then the extracted data is encapsulated into the internal layer MPLS LSP corresponding to the internal layer MPLS LSP label or the internal layer PW corresponding to the internal layer PW label, and is further encapsulated into the corresponding external layer MPLS LSP.

A format of the preset corresponding relation table of the primary index ID or primary logical partition ID and the external layer MPLS LSP label is as shown in Table 16, and a format of the preset corresponding relation table of the secondary index ID or secondary logical partition ID and the internal layer MPLS LSP label or the internal layer PW label is as shown in Table 19.

TABLE 16

| Primary Index ID or Primary Logical Partition ID | External Layer MPLS LSP Label |
| --- | --- |

Table 16 includes a corresponding relation of: Primary Logical Partition ID and External Layer MPLS LSP Label, or a corresponding relation of: Primary Index ID and External Layer MPLS LSP Label.

TABLE 17

| Secondary Index ID or Secondary Logical Partition ID | Internal Layer MPLS LSP Label or Internal Layer PW Label |
| --- | --- |

Table 17 includes a corresponding relation of: Secondary Logical Partition ID and Internal Layer MPLS LSP Label, or a corresponding relation of: Secondary Index ID and Internal Layer MPLS LSP Label, or a corresponding relation of: Secondary Logical Partition ID and Internal Layer PW Label, or a corresponding relation of: Secondary Index ID and Internal Layer PW Label.

It should be noted that, in a case that the external layer MPLS LSP and the internal layer MPLS LSP are adopted, for the types of data that can be directly borne by the MPLS, for example, data in the Ethernet, IP, MPLS or PW type, the data can be directly encapsulated into the MPLS LSP; while for the types of data that cannot be directly borne by the MPLS, for example, data in the TDM type, PW encapsulation is required to be firstly performed on the data on the OLT, and then the data is encapsulated into the MPLS LSP.

Downlink direction:

In step 1101, the OLT receives a downlink packet, searches a preset corresponding relation table of the primary index ID or primary logical partition ID and the external layer MPLS LSP label according to the external layer MPLS LSP label of the downlink packet, retrieves the corresponding primary index ID or primary logical partition ID; searches the preset corresponding relation table of the secondary index ID or secondary logical partition ID and the internal layer MPLS LSP label or the PW label according to the internal layer MPLS LSP label or the PW label, and retrieves the corresponding secondary index ID or secondary logical partition ID.

A format of the preset corresponding relation table of the primary index ID or primary logical partition ID and the external layer MPLS LSP label is as shown in Table 16, and a format of the preset corresponding relation table of the secondary index ID or secondary logical partition ID and the internal layer MPLS LSP label or the internal layer PW label is as shown in Table 17.

In step 1102, the preset corresponding relation table of the primary logical partition ID, the secondary logical partition ID, and the PON Logical Link ID, or the preset corresponding relation table of the primary index ID, the secondary index ID, and the PON Logical Link ID is searched according to the retrieved primary logical partition ID and the secondary logical partition ID or the primary index ID and the secondary index ID, the PON Port ID and the PON Logical Link ID, or the ONU ID and the PON Logical Link ID corresponding to the primary index ID or primary logical partition ID and the secondary index ID or secondary logical partition ID are retrieved, data borne by the MPLS LSP or the PW is extracted, and then the extracted data is encapsulated into a PON logical link corresponding to the PON Logical Link ID.

A format of the preset corresponding relation table of the primary logical partition ID, the secondary logical partition ID, and the PON Logical Link ID, or the preset corresponding relation table of the primary index ID, the secondary index ID and the PON Logical Link ID is as shown in Table 15.

It should be noted that, the extracting the data borne by the MPLS LSP or the PW includes the following steps. The external layer MPLS LSP is decapsulated, and then the data borne by the internal layer MPLS LSP or the internal layer PW is extracted. If additional PW encapsulation is performed in the uplink direction, PW decapsulation is required to be firstly performed, and then the data is encapsulated into the PON logical link.

The method according to the embodiment of the present invention realizes mapping between the PON logical link and the MPLS tunnel by establishing a corresponding relation of a PON logical link and an MPLS tunnel, so that the service configuration has an unlimited capacity and becomes more flexible; further simplifies the management, and improves the efficiency by categorizing the PON Logical Link ID; and additionally, realizes subtle mapping and management for the hierarchy of the PON logical link by grading the index ID or the logical partition ID.

Second Embodiment

Figure 4:
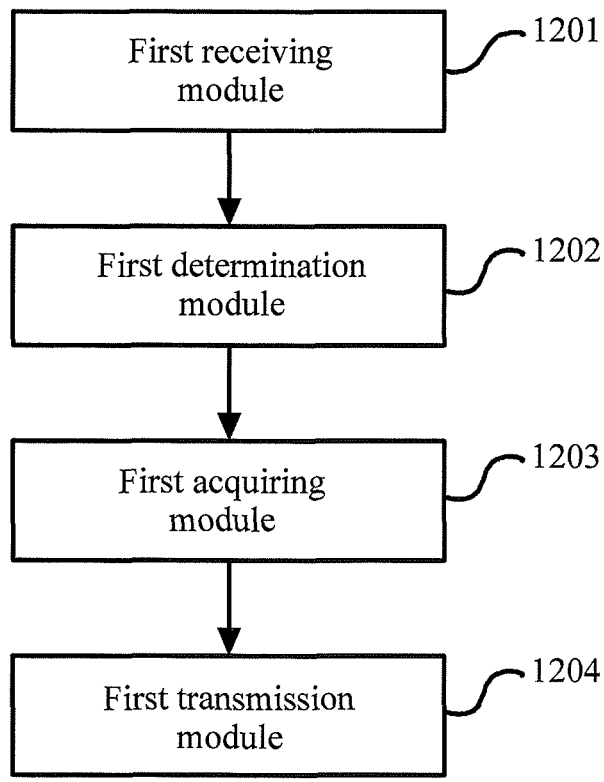
FIG. 4 is a schematic structural view of an OLT according to a second embodiment of the present invention.

FIG. 4 is a schematic structural view of an OLT according to a second embodiment of the present invention. The embodiment of the present invention provides an OLT. Referring to FIG. 4, the OLT includes a first receiving module 1201, a first determination module 1202, a first acquiring module 1203, and a first transmission module 1204.

The first receiving module 1201 is configured to receive from a port a first uplink packet from an ONU, where the first uplink packet includes a Logical Link ID for identifying a logical link between the OLT and the ONU.

The first determination module 1202 is configured to determine a first ID corresponding to the first uplink packet according to the first uplink packet, where the first ID includes an ONU ID for identifying the ONU or a Port ID for identifying the port.

The first acquiring module 1203 is configured to acquire an MPLS tunnel label corresponding to the Logical Link ID and the first ID according to the Logical Link ID and the first ID.

The first transmission module 1204 is configured to transmit a second uplink packet on an MPLS tunnel corresponding to the MPLS tunnel label, where the second uplink packet includes data in the first uplink packet and the MPLS tunnel label.

The first acquiring module 1203 includes a first search unit and a first acquiring unit.

The first search unit is configured to search a preset first corresponding relation table according to the Logical Link ID and the first ID, acquire a search result, and send the search result to the first acquiring unit, where the first corresponding relation table includes a corresponding relation of the Logical Link ID, the first ID and the MPLS tunnel label. The Logical Link ID includes a GEM Port ID or an LLID, and the MPLS tunnel label includes an MPLS LSP label.

The first acquiring unit is configured to acquire the MPLS tunnel label according to the search result of the first search unit.

It should be noted that, the search result includes the MPLS tunnel label corresponding to the Logical Link ID and the first ID.

The first acquiring module 1203 includes a second search unit and a second acquiring unit.

The second search unit is configured to search a preset second corresponding relation table according to the Logical Link ID and the first ID, acquire a search result, and send the search result to the second acquiring unit, where the second corresponding relation table includes a corresponding relation of the Logical Link ID, the first ID, and a first intermediate ID, and a corresponding relation of a second intermediate ID and the MPLS tunnel label. The Logical Link ID includes the GEM Port ID or the LLID, the first intermediate ID and the second intermediate ID include an index ID or a logical partition ID, and the MPLS tunnel label includes the MPLS LSP label.

The second acquiring unit is configured to acquire the MPLS tunnel label according to the search result acquired by the second search unit.

It should be noted that, the search result includes the MPLS tunnel label corresponding to the Logical Link ID and the first ID.

Additionally, the MPLS tunnel label further includes a PW label, and in this case, specifically, the MPLS tunnel label includes an external layer MPLS LSP label and an internal layer PW label; or the MPLS tunnel label includes the external layer MPLS LSP label and an internal layer MPLS LSP label. The second intermediate ID further includes an inlet Port ID.

The first acquiring module 1203 includes a third search unit and a third acquiring unit.

The third search unit is configured to search a preset third corresponding relation table according to the Logical Link ID and the first ID, require a search result, and send the search result to the third acquiring unit, where the third corresponding relation table includes a corresponding relation of the Logical Link ID, the first ID, a primary intermediate ID, and a secondary intermediate ID, a corresponding relation of the primary intermediate ID and an external layer MPLS tunnel label in the MPLS tunnel label, and a corresponding relation of the secondary intermediate ID and an internal layer MPLS tunnel label in the MPLS tunnel label. The Logical Link ID includes the GEM Port ID or the LLID, the MPLS tunnel label includes the external layer MPLS tunnel label and the internal layer MPLS tunnel label, the external layer MPLS tunnel label is an external layer MPLS LSP label, and the internal layer MPLS tunnel label is an internal layer MPLS LSP label or an internal layer PW label.

The third acquiring unit is configured to acquire the MPLS tunnel label according to the search result acquired by the third search unit.

It should be noted that, the search result includes the MPLS tunnel label corresponding to the Logical Link ID and the first ID.

The OLT according to the embodiment of the present invention realizes mapping between the logical link and the MPLS tunnel by establishing a corresponding relation of a logical link, created between the OLT and the ONU, and the MPLS tunnel, so that the service configuration has an unlimited capacity and becomes more flexible; further simplifies the management, and improves the efficiency by categorizing the Logical Link ID; and additionally, realizes subtle mapping and management for the hierarchy of the logical link by grading the index ID or the logical partition ID.

Third Embodiment

Figure 5:
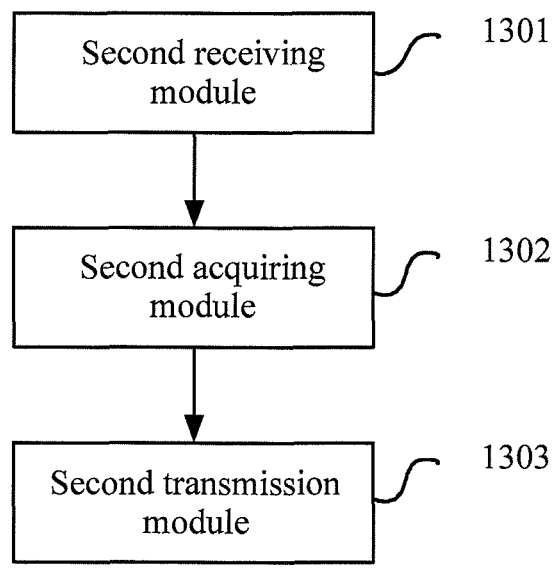
FIG. 5 is a schematic structural view of another OLT according to a third embodiment of the present invention.

FIG. 5 is a schematic structural view of another OLT according to a third embodiment of the present invention. The embodiment of the present invention provides an OLT. Referring to FIG. 5, the OLT includes a second receiving module 1301, a second acquiring module 1302, and a second transmission module 1303.

The second receiving module 1301 is configured to receive a first downlink packet, where the first downlink packet includes an MPLS tunnel label.

The second acquiring module 1302 is configured to acquire a first ID corresponding to the MPLS tunnel label and a Logical Link ID for identifying a logical link between the OLT and an ONU according to the MPLS tunnel label, where the first ID includes a Port ID for identifying a port or an ONU ID for identifying the ONU.

The second transmission module 1303 is configured to transmit a second downlink packet on the logical link corresponding to the Logical Link ID, where the second downlink packet includes data in the first downlink packet and the Logical Link ID.

The second acquiring module 1302 includes a fourth search unit and a fourth acquiring unit.

The fourth search unit is configured to search a preset fourth corresponding relation table according to the MPLS tunnel label, require a search result, and send the search result to the fourth acquiring unit, where the fourth corresponding relation table includes a corresponding relation of the MPLS tunnel label, the first ID, and the Logical Link ID. The MPLS tunnel label includes the MPLS LSP label, and the Logical Link ID includes the GEM Port ID or the LLID.

The fourth acquiring unit is configured to acquire the first ID and the Logical Link ID according to the search result required by the fourth search unit.

It should be noted that, the search result includes the first ID and the Logical Link ID corresponding to the MPLS tunnel label.

The second acquiring module 1302 includes a fifth search unit and a fifth acquiring unit.

The fifth search unit is configured to search a preset fifth corresponding relation table according to the MPLS tunnel label, require a search result, and send the search result to the fifth acquiring unit, where the fifth corresponding relation table includes a corresponding relation of an external layer MPLS tunnel label in the MPLS tunnel label and a primary intermediate ID, a corresponding relation of an internal layer MPLS tunnel label in the MPLS tunnel label and a secondary intermediate ID, and a corresponding relation of a primary intermediate ID, a secondary intermediate ID, the first ID, and the Logical Link ID. The MPLS tunnel label includes the external layer MPLS tunnel label and the internal layer MPLS tunnel label, the external layer MPLS tunnel label is an external layer MPLS LSP label, the internal layer MPLS tunnel label is an internal layer MPLS LSP label or an internal layer PW label, the primary intermediate ID includes a primary logical partition ID or a primary index ID, the secondary intermediate ID includes a secondary logical partition ID or a secondary index ID, and the Logical Link ID includes the GEM Port ID or the LLID.

The fifth acquiring unit is configured to acquire the first ID and the Logical Link ID according to the search result required by the fifth search unit.

It should be noted that, the search result includes the first ID and the Logical Link ID corresponding to the MPLS tunnel label.

The OLT according to the embodiment of the present invention realizes mapping between the logical link and the MPLS tunnel by establishing a corresponding relation of a logical link, created between the OLT and the ONU, and the MPLS tunnel, so that the service configuration has an unlimited capacity and becomes more flexible; further simplifies the management, and improves the efficiency by categorizing the Logical Link ID; and additionally, realizes subtle mapping and management for the hierarchy of the logical link by grading the index ID or the logical partition ID.

Fourth Embodiment

Figure 6:
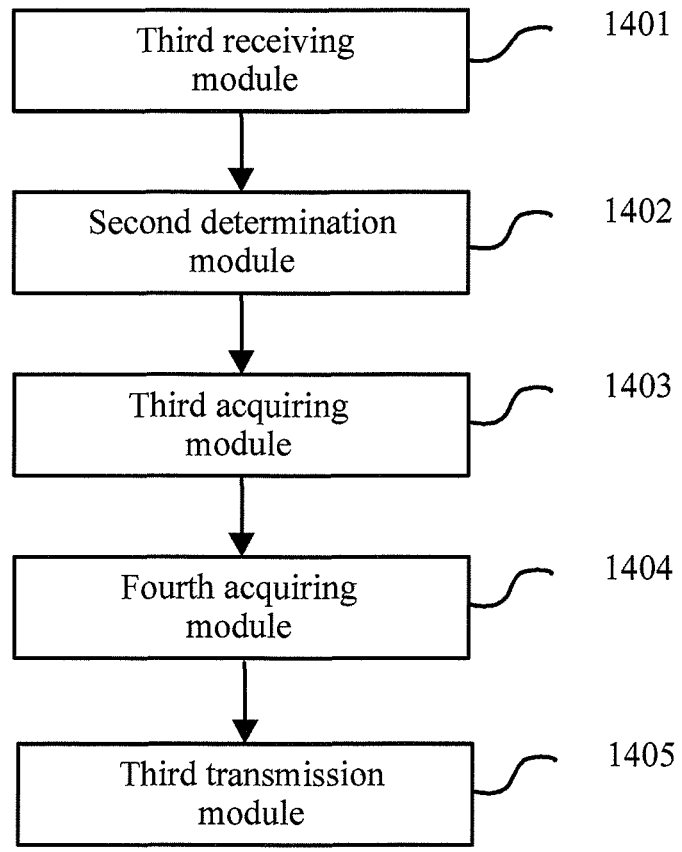
FIG. 6 is a schematic structural view of still another OLT according to a fourth embodiment of the present invention.

FIG. 6 is a schematic structural view of still another OLT according to a fourth embodiment of the present invention. The embodiment of the present invention provides an OLT. Referring to FIG. 6, the OLT includes a third receiving module 1401, a second determination module 1402, a third acquiring module 1403, a fourth acquiring module 1404, and a third transmission module 1405.

The third receiving module 1401 is configured to receive from a port a first uplink packet from an ONU, where the first uplink packet includes a Logical Link ID for identifying a logical link between the OLT and the ONU.

The second determination module 1402 is configured to determine a mapping key domain of the Logical Link ID according to the Logical Link ID.

The third acquiring module 1403 is configured to acquire an index ID or a logical partition ID corresponding to the mapping key domain according to the mapping key domain of the Logical Link ID.

The fourth acquiring module 1404 is configured to acquire an MPLS tunnel label corresponding to the index ID or the logical partition ID according to the index ID or the logical partition ID acquired by the third acquiring module 1403.

The third transmission module 1405 is configured to transmit a second uplink packet on an MPLS tunnel corresponding to the MPLS tunnel label acquired by the fourth acquiring module 1404, where the second uplink packet includes data in the first uplink packet and the MPLS tunnel label.

The mapping key domain of the Logical Link ID is specifically as follows. Preceding n bits of the Logical Link ID (the preceding n bits are referred to as the mapping key domain) represent an index ID or a logical partition ID corresponding to the mapping key domain. The magnitude of n can be specified as required, but is smaller than the maximal length of the adopted Logical Link ID.

The OLT according to the embodiment of the present invention realizes mapping between the logical link and the MPLS tunnel by establishing a corresponding relation of a logical link, created between the OLT and the ONU, and the MPLS tunnel, so that the service configuration has an unlimited capacity and becomes more flexible.

Fifth Embodiment

Figure 7:
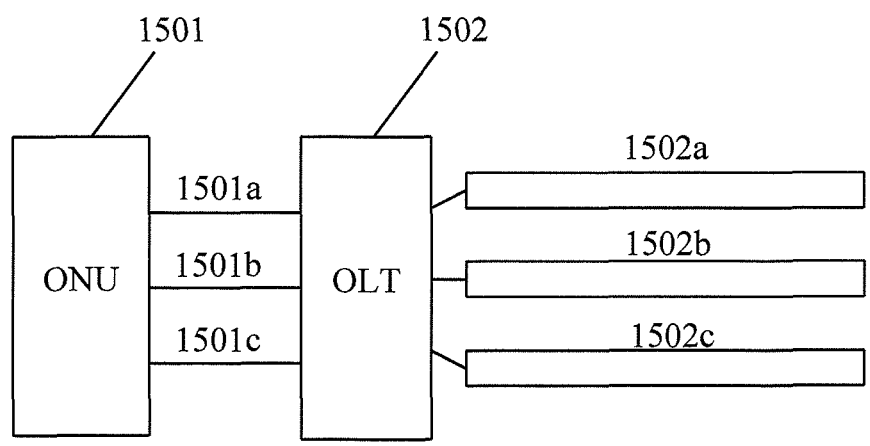
FIG. 7 is a schematic structural view of a system for packet transmission in an optical communication system according to a fifth embodiment of the present invention.

FIG. 7 is a schematic structural view of a system for packet transmission in an optical communication system according to a fifth embodiment of the present invention. The embodiment of the present invention provides a system for packet transmission. Referring to FIG. 7, the system includes an ONU 1501 and an OLT 1502.

The ONU 1501 is configured to send a first uplink packet, where the first uplink packet includes a Logical Link ID for identifying a logical link between the OLT and the ONU.

The OLT 1502 is configured to receive a first uplink packet sent by the ONU 1501, determine a first ID corresponding to the first uplink packet according to the first uplink packet, acquire an MPLS tunnel label corresponding to the Logical Link ID and the first ID according to the Logical Link ID and the first ID, and transmit a second uplink packet on an MPLS tunnel corresponding to the MPLS tunnel label, where the first ID includes an ONU ID for identifying the ONU or a Port ID for identifying a port, and the second uplink packet includes data in the first uplink packet and the MPLS tunnel label.

The OLT may search a preset corresponding relation table according to the Logical Link ID and the first ID, so as to acquire the MPLS tunnel label. The OLT may be connected with one or more ONUs, and an example that the OLT is connected with one ONU is merely given in FIG. 7. It should be noted that, at least one logical link is provided between the OLT and the ONU, and at least one MPLS tunnel is also provided. Referring to FIG. 7, 1501a represents a logical link 1, 1501b represents a logical link 2, and 1501c represents a logical link 3; 1502a represents an MPLS tunnel 1, 1502b represents an MPLS tunnel 2, and 1502c represents an MPLS tunnel 3.

The following contents are further included.

The OLT 1502 is further configured to receive a first downlink packet, where the first downlink packet includes an MPLS tunnel label; acquire a first ID corresponding to the MPLS tunnel label and a Logical Link ID for identifying a logical link between the OLT and the ONU according to the MPLS tunnel label; and transmit a second downlink packet on the logical link corresponding to the Logical Link ID, where the first ID includes a Port ID for identifying a port or an ONU ID for identifying the ONU, and the second downlink packet includes data in the first downlink packet and the Logical Link ID.

The ONU 1501 is further configured to receive the second uplink packet sent by the OLT 1502.

The system according to the embodiment of the present invention realizes mapping between the logical link and the MPLS tunnel by establishing a corresponding relation of a logical link, created between the OLT and the ONU, and the MPLS tunnel, so that the service configuration has an unlimited capacity and becomes more flexible; further simplifies the management, and improves the efficiency by categorizing the Logical Link ID; and additionally, realizes subtle mapping and management for the hierarchy of the logical link by grading the index ID or the logical partition ID.

All or part of the technical solutions according to the embodiments may be implemented through software programming. The software program may be stored in a computer readable storage medium such as a hard disk, an optical disk or a floppy disk.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for packet transmission in an optical communication system, wherein an Optical Line Terminal (OLT) at a central office end in the optical communication system comprises one or more ports, and each port is connected to one or more Optical Network Units (ONUs) at a remote end, the method comprising:
   receiving, from a port, a first uplink packet from an ONU, wherein the first uplink packet comprises a Logical Link Identifier (ID) for identifying a logical link between the OLT and the ONU;
   determining a first ID corresponding to the first uplink packet according to the first uplink packet, wherein the first ID comprises an ONU ID for identifying the ONU or a Port ID for identifying the port;
   acquiring a Multiprotocol Label Switching (MPLS) tunnel label corresponding to the Logical Link ID and the first ID according to the Logical Link ID and the first ID; and
   transmitting a second uplink packet on an MPLS tunnel corresponding to the MPLS tunnel label, wherein the second uplink packet comprises data in the first uplink packet and the MPLS tunnel label;
   wherein the acquiring the MPLS tunnel label corresponding to the Logical Link ID (LLID) and the first ID according to the LLID and the first ID comprises:
   searching a preset corresponding relation between the LLID, the first ID and a logical partition ID/index ID, according to the Logical Link ID and the first ID, and acquiring a logical partition ID/index ID corresponding to the LLID and the first ID, searching a preset corresponding relation between a logical partition ID/index ID and an MPLS tunnel label according to the acquired logical partition ID/index ID, and acquiring the MPLS tunnel label, wherein the LLID comprises a Gigabit Passive Optical Network (GPON) Encapsulation Method (GEM) Port ID and the MPLS tunnel label comprises an MPLS label Switched Path (LSP) label.

2. A method for packet transmission in an optical communication system, wherein an Optical Line Terminal (OLT) at a central office end in the optical communication system comprises one or more ports, and each port is connected to one or more Optical Network Units (ONUs) at a remote end, the method comprising:
   receiving, from a port, a first uplink packet from an ONU, wherein the first uplink packet comprises a Logical Link Identifier (ID) for identifying a logical link between the OLT and the ONU;
   determining a first ID corresponding to the first uplink packet according to the first uplink packet, wherein the first ID comprises an ONU ID for identifying the ONU or a Port ID for identifying the port;
   acquiring a Multiprotocol Label Switching (MPLS) tunnel label corresponding to the Logical Link ID and the first ID according to the Logical Link ID and the first ID; and
   transmitting a second uplink packet on an MPLS tunnel corresponding to the MPLS tunnel label, wherein the second uplink packet comprises data in the first uplink packet and the MPLS tunnel label;
   wherein the acquiring the MPLS tunnel label corresponding to the Logical Link ID and the first ID according to the Logical Link ID and the first ID comprises:
   searching a preset third corresponding relation table according to the Logical Link ID and the first ID, and acquiring the MPLS tunnel label, wherein the third corresponding relation table comprises a corresponding relation of the Logical Link ID, the first ID, a primary intermediate ID, and a secondary intermediate ID, a corresponding relation of the primary intermediate ID, and an external layer MPLS tunnel label in the MPLS tunnel label, and a corresponding relation of the secondary intermediate ID and an internal layer MPLS tunnel label in the MPLS tunnel label, wherein the Logical Link ID comprises a Gigabit Passive Optical Network (GPON) Encapsulation Method (GEM) Port ID, the MPLS tunnel label comprises the external layer MPLS tunnel label and the internal layer MPLS tunnel label, the external layer MPLS tunnel label is an external layer MPLS label Switched Path (LSP) label, and the internal layer MPLS tunnel label is an internal layer MPLS LSP label or an internal layer Pseudo Wires (PW) label.

3. A method for packet transmission in an optical communication system, wherein an Optical Line Terminal (OLT) at a central office end in the optical communication system comprises one or more ports, and each port is connected to one or more Optical Network Units (ONUs) at a remote end, the method comprising:
   receiving, from a port, a first uplink packet from an ONU, wherein the first uplink packet comprises a Logical Link Identifier (ID) for identifying a logical link between the OLT and the ONU;
   determining a first ID corresponding to the first uplink packet according to the first uplink packet, wherein the first ID comprises an ONU ID for identifying the ONU or a Port ID for identifying the port;
   acquiring a Multiprotocol Label Switching (MPLS) tunnel label corresponding to the Logical Link ID and the first ID according to the Logical Link ID and the first ID; and
   transmitting a second uplink packet on an MPLS tunnel corresponding to the MPLS tunnel label, wherein the second uplink packet comprises data in the first uplink packet and the MPLS tunnel label;
   receiving a first downlink packet, wherein the first downlink packet comprises a Multiprotocol Label Switching (MPLS) tunnel label;
   acquiring a first Identifier (ID) corresponding to the MPLS tunnel label and a Logical Link ID for identifying a logical link between the OLT and the ONU according to the MPLS tunnel label, wherein the first ID comprises a Port ID for identifying a port or an ONU ID for identifying the ONU; and
   transmitting a second downlink packet on the logical link corresponding to the Logical Link ID, wherein the second downlink packet comprises data in the first downlink packet and the Logical Link ID;
   wherein the acquiring the first ID corresponding to the MPLS tunnel label and the Logical Link ID for identifying the logical link between the OLT and the ONU according to the MPLS tunnel label comprises:
   searching a preset fifth corresponding relation table according to the MPLS tunnel label, and acquiring the first ID and the Logical Link ID, wherein the fifth corresponding relation table comprises a corresponding relation of an external layer MPLS tunnel label in the MPLS tunnel label and a primary intetmediate ID, a corresponding relation of an internal layer MPLS tunnel label in the MPLS tunnel label and a secondary intermediate ID, and a corresponding relation of the primary intermediate ID, the secondary intermediate ID, the first ID, and the Logical Link ID, wherein the MPLS tunnel label comprises the external layer MPLS tunnel label and the internal layer MPLS tunnel label, the external layer MPLS tunnel label is an external layer MPLS label Switched Path (LSP) label, the internal layer MPLS tunnel label is an internal layer MPLS LSP label or an internal layer Pseudo Wires (PW) label, the primary intermediate ID comprises a primary logical partition ID or a primary index ID, the secondary intermediate ID comprises a secondary logical partition ID or a secondary index ID, and the Logical Link ID comprises a Gigabit Passive Optical Network (GPON) Encapsulation Method (GEM) Port ID.

4. An Optical Line Terminal (OLT), comprising:
a first receiving module, configured to receive, from a port, a first uplink packet from an Optical Network Unit (ONU), wherein the first uplink packet comprises a Logical Link Identifier (ID) for identifying a logical link between the OLT and the ONU;
a first determination module, configured to determine a first ID corresponding to the first uplink packet according to the first uplink packet, wherein the first ID comprises an ONU ID for identifying the ONU or a Port ID for identifying the port;
a first acquiring module, configured to acquire a Multiprotocol Label Switching (MPLS) tunnel label corresponding to the Logical Link ID (LLID) and the first ID according to the LLID and the first ID; and
a first transmission module, configured to transmit a second uplink packet on an MPLS tunnel corresponding to the MPLS tunnel label, wherein the second uplink packet comprises data in the first uplink packet and the MPLS tunnel label;
wherein the first acquiring module comprises:
a second search unit, configured to search a preset corresponding relation between the LLID, the first ID and a logical partition ID/index ID, according to the LLID and the first ID, acquire a logical partition ID/index ID corresponding to the LLID and the first ID, search a preset corresponding relation between a logical partition ID/index ID and a MPLS tunnel label according to the acquired logical partition ID/index ID, and acquire a search result, and send the search result to a second acquiring unit, wherein the LLID comprises a Gigabit Passive Optical Network (GPON) Encapsulation Method (GEM) Port ID, and the MPLS tunnel label comprises an MPLS label Switched Path (LSP) label; and
the second acquiring unit, configured to acquire the MPLS tunnel label according to the search result acquired by the second search unit.

5. An Optical Line Terminal (OLT), comprising:
a first receiving module, configured to receive, from a port, a first uplink packet from an Optical Network Unit (ONU), wherein the first uplink packet comprises a Logical Link Identifier (ID) for identifying a logical link between the OLT and the ONU;
a first determination module, configured to determine a first ID corresponding to the first uplink packet according to the first uplink packet, wherein the first ID comprises an ONU ID for identifying the ONU or a Port ID for identifying the port;
a first acquiring module, configured to acquire a Multiprotocol Label Switching (MPLS) tunnel label corresponding to the Logical Link ID (LLID) and the first ID according to the LLID and the first ID; and
a first transmission module, configured to transmit a second uplink packet on an MPLS tunnel corresponding to the MPLS tunnel label, wherein the second uplink packet comprises data in the first uplink packet and the MPLS tunnel label;
wherein the first acquiring module comprises:
a third search unit, configured to search a preset third corresponding relation table according to the LLID and the first ID, acquire a search result, and send the search result to a third acquiring unit, wherein the third corresponding relation table comprises a corresponding relation of the LLID, the first ID, a primary intermediate ID, and a secondary intermediate ID, a corresponding relation of the primary intermediate ID and an external layer MPLS tunnel label in the MPLS tunnel label, and a corresponding relation of the secondary intermediate ID and an internal layer MPLS tunnel label in the MPLS tunnel label, wherein the LLID comprises a Gigabit Passive Optical Network (GPON) Encapsulation Method (GEM) Port ID, the MPLS tunnel label comprises the external layer MPLS tunnel label and the internal layer MPLS tunnel label, the external layer MPLS tunnel label is an external layer MPLS label Switched Path (LSP) label, and the internal layer MPLS tunnel label is an internal layer MPLS LSP label or an internal layer Pseudo Wires (PW) label; and
the third acquiring unit, configured to acquire the MPLS tunnel label according to the search result acquired by the third search unit.

6. An Optical Line Terminal (OLT), comprising:
a first receiving module, configured to receive, from a port, a first uplink packet from an Optical Network Unit (ONU), wherein the first uplink packet comprises a Logical Link Identifier (ID) for identifying a logical link between the OLT and the ONU;
a first determination module, configured to determine a first ID corresponding to the first uplink packet according to the first uplink packet, wherein the first ID comprises an ONU ID for identifying the ONU or a Port ID for identifying the port;
a first acquiring module, configured to acquire a Multiprotocol Label Switching (MPLS) tunnel label corresponding to the Logical Link ID (LLID) and the first ID according to the LLID and the first ID; and
a first transmission module, configured to transmit a second uplink packet on an MPLS tunnel corresponding to the MPLS tunnel label, wherein the second uplink packet comprises data in the first uplink packet and the MPLS tunnel label;
a second receiving module, configured to receive a first downlink packet, wherein the first downlink packet comprises a Multiprotocol Label Switching (MPLS) tunnel label;
a second acquiring module, configured to acquire a first Identifier (ID) corresponding to the MPLS tunnel label and a Logical Link ID for identifying a logical link between the OLT and an Optical Network Unit (ONU) according to the MPLS tunnel label, wherein the first ID comprises a Port ID for identifying a port or an ONU ID for identifying the ONU; and
a second transmission module, configured to transmit a second downlink packet on the logical link corresponding to the Logical Link ID, wherein the second downlink packet comprises data in the first downlink packet and the Logical Link ID;

wherein the second acquiring module comprises:
a fifth search unit, configured to search a preset fifth corresponding relation table according to the MPLS tunnel label, acquire a search result, and send the search result to a fifth acquiring unit, wherein the fifth corresponding relation table comprises a corresponding relation of an external layer MPLS tunnel label in the MPLS tunnel label and a primary intermediate ID, a corresponding relation of an internal layer MPLS tunnel label in the MPLS tunnel label and a secondary intermediate ID, and a corresponding relation of the primary intermediate ID, the secondary intermediate ID, the first ID, and the Logical Link ID, wherein the MPLS tunnel label comprises the external layer MPLS tunnel label and the internal layer MPLS tunnel label, the external layer MPLS tunnel label is an external layer MPLS label Switched Path (LSP) label, the internal layer MPLS tunnel label is an internal layer MPLS LSP label or an internal layer Pseudo Wires (PW) label, the primary intermediate ID comprises a primary logical partition ID or a primary index ID, the secondary intermediate ID comprises a secondary logical partition ID or a secondary index ID, and the Logical Link ID comprises a Gigabit Passive Optical Network (GPON) Encapsulation Method (GEM) Port ID; and
the fifth acquiring unit, configured to acquire the first ID and the Logical Link ID according to the search result acquired by the fifth search unit.

* * * * *